(12) United States Patent
Maruo et al.

(10) Patent No.: US 7,461,630 B2
(45) Date of Patent: Dec. 9, 2008

(54) ELECTRONIC THROTTLE VALVE CONTROL SYSTEM AND TWO-WHEELED MOTOR VEHICLE

(75) Inventors: Keisuke Maruo, Shizuoka (JP); Tomoaki Kishi, Shizuoka (JP); Takeshi Matsuda, Shizuoka (JP); Masato Yokoi, Shizuoka (JP); Naoya Yamaguchi, Shizuoka (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 74 days.

(21) Appl. No.: 10/579,010

(22) PCT Filed: Nov. 9, 2004

(86) PCT No.: PCT/JP2004/016609

§ 371 (c)(1),
(2), (4) Date: May 24, 2007

(87) PCT Pub. No.: WO2005/054647

PCT Pub. Date: Jun. 16, 2005

(65) Prior Publication Data

US 2008/0022970 A1    Jan. 31, 2008

(30) Foreign Application Priority Data

Nov. 12, 2003 (JP) ............ 2003-382033
Apr. 7, 2004 (JP) ............ 2004-113570

(51) Int. Cl.
*F02D 11/10* (2006.01)
*F02D 9/16* (2006.01)

(52) U.S. Cl. .................. 123/397; 123/399

(58) Field of Classification Search ........... 123/396, 123/397, 399
See application file for complete search history.

(56) References Cited

U.S. PATENT DOCUMENTS

| 4,210,110 | A * | 7/1980 | Krebaum et al. ............ 123/396 |
| 4,831,985 | A * | 5/1989 | Mabee et al. ............... 123/399 |
| 5,325,832 | A * | 7/1994 | Maute et al. ............... 123/396 |
| 5,664,542 | A * | 9/1997 | Kanazawa et al. .......... 123/361 |
| 6,173,939 | B1 * | 1/2001 | Dottavio et al. ........ 251/129.12 |
| 6,386,178 | B1 * | 5/2002 | Rauch ....................... 123/337 |
| 6,575,427 | B1 * | 6/2003 | Rauch et al. ................ 251/69 |
| 6,734,582 | B2 * | 5/2004 | Corbett et al. ............... 310/12 |
| 6,966,297 | B2 * | 11/2005 | Wayama et al. ............. 123/399 |

FOREIGN PATENT DOCUMENTS

| JP | 06-248979 | 9/1994 |
| JP | 2002-106368 | 4/2002 |
| JP | 2002-256896 | 9/2002 |
| JP | 2003-201866 | 7/2003 |

* cited by examiner

*Primary Examiner*—Erick Solis
(74) *Attorney, Agent, or Firm*—Hogan & Hartson LLP

(57) ABSTRACT

An electronic throttle valve control system prevents rapid rotation of a throttle valve reliably when the control system has a failure. A throttle valve controls the amount of intake air to an internal combustion engine, an electric motor drives the throttle valve, and a rotational speed reduction mechanism reduces the rotation of the electric motor to control the rotation of the throttle valve. An urging mechanism urges the throttle valve in the closing direction. An attenuation mechanism attenuates the speed at which the throttle valve is rotated in the closing direction by the urging mechanism when the control system has a failure. The attenuation mechanism is the electric motor in a regenerative mode or an air damper.

12 Claims, 10 Drawing Sheets

ELECTRONIC THROTTLE VALVE CONTROL SYSTEM AND TWO-WHEELED MOTOR VEHICLE

CROSS-REFERENCE TO THE RELATED APPLICATIONS

This application is a national phase of PCT application No. PCT/JP2004/016609, filed Nov. 9, 2004, the entire contents of which are incorporated by reference. This application also claims benefit of priority under 35 U.S.C § 119 to Japanese Patent Application No. 2003-382033 filed Nov. 12, 2003 and Japanese Patent Application No. 2004-113570 filed Apr. 7, 2004, the entire contents of which are incorporated by reference.

TECHNICAL FIELD

The present invention relates to an electronic throttle valve control system and, more particularly, to an electronic throttle valve control system prepared for a failure in the system.

BACKGROUND ART

An electronic throttle valve system for electronically controlling the opening of a throttle valve to adjust the amount of intake air to an engine (internal combustion engine) can reduce emission and fuel consumption and has been used in some four-wheeled motor vehicles.

Such an electronic throttle valve system is equipped with a function which stops the driving of the throttle valve by an electric motor and returns the throttle valve to the full closed position with the urging force of a spring when the control system has a failure. The engine is therefore maintained in such a state that a failure operation can be conducted and the vehicle can be driven to a place.

When a bypass line is provided so that a certain amount of air can be sucked into the engine even when the throttle valve is returned to the full closed position by the urging force of a spring, the engine can be maintained in such a state that a failure operation can be conducted.

Patent Document 1 discloses a method of rotating a throttle valve and holding it in a predetermined opening position by urging forces of a spring for urging the throttle valve in the closing direction and another spring for urging the throttle valve in the opening direction without a bypass line.

The speed, at which a throttle valve is rotated in the closing direction by the urging force of a spring when the control system has a failure, is very high. Thus, the output of the engine is rapidly decreased. In the case of a motor vehicle (four-wheeled motor vehicle), the driver does not feel a change in the motion of the vehicle even when the engine output is rapidly decreased since the vehicle is heavy. In the case of a two-wheeled motor vehicle which is light, however, the rider feels a change in the motion of the vehicle.

Patent Document 2 discloses a method of closing a throttle valve gently by applying a resistance to the rotation of the throttle valve urged in the closing direction by a spring to prevent rapid rotation of the throttle valve. A rapid decrease in the engine output can be thus avoided and the vehicle does not make jerky movements even when running in low gear. As the means for applying a resistance to the rotation of the throttle valve (cushioning mechanism), an electronic damper using an electroviscous fluid is used.

Patent Document 3 discloses an example in which an electronic throttle valve system is applied to a two-wheeled motor vehicle.

Patent document 1: JP-A-2003-201866
Patent document 2: JP-A-Hei 6-248979
Patent document 3: JP-A-2002-106368

DISCLOSURE OF THE INVENTION

Problem to be Solved by the Invention

The method disclosed in Patent Document 2 is excellent in preventing rapid rotation of the throttle valve. However, since the spring for urging the throttle valve in the closing direction and the means for applying a resistance to the rotation of the throttle valve (cushioning means) are attached to the valve shaft of the throttle valve, a space for housing the mechanism must be provided around the valve shaft.

For instance, in the example disclosed in Patent Document 2, the valve shaft of the throttle valve is extended to the right or left and a piston and a return spring of an electronic damper (cushioning means) is connected to the extended portion of the valve shaft, a housing space almost equal in size to a throttle body is required.

Such a mechanism has not been employed in two-wheeled motor vehicles because it is difficult to provide a housing space to install such an additional mechanism as in four-wheeled motor vehicles and because the mechanism has to be installed in the vicinity of the valve shaft.

The present invention has been made in view of the above points and it is, therefore, an object of the present invention is to provide an electronic throttle valve control system which requires no additional housing space and can reliably prevent rapid rotation of a throttle valve when the control system has a failure.

An electronic throttle valve control system according to the present invention has: a throttle valve for controlling the amount of intake air to an internal combustion engine; an electric motor for driving the throttle valve; and a rotational speed reduction mechanism for reducing the rotation of the electric motor to control the rotation of the throttle valve. The control system further comprises: an urging mechanism for urging the throttle valve in the closing direction; and an attenuation mechanism for attenuating the speed at which the throttle valve is rotated in the closing direction by the urging force of the urging mechanism when the control system has a failure, wherein at least one of the urging mechanism and the attenuation mechanism is connected to the rotational speed reduction mechanism.

In a preferred embodiment, the urging mechanism is incorporated in the rotational speed reduction mechanism and the attenuation mechanism is connected to the rotational speed reduction mechanism.

In a preferred embodiment, the rotational speed reduction mechanism is connected to the electric motor, and the electric motor is shifted to a regenerative mode and serves as the attenuation mechanism when the control system has a failure.

In a preferred embodiment, the internal combustion engine is a multi-cylinder internal combustion engine having a plurality of cylinders, each provided with a throttle valve, and the rotational speed reduction mechanism is located between two of the throttle valves.

In a preferred embodiment, the rotational speed reduction mechanism is constituted of a plurality of rotors provided between the electric motor and the throttle valve, and the urging mechanism is attached to at least one of the plurality of rotors.

In a preferred embodiment, the attenuation mechanism is constituted of a piston reciprocable in a cylinder and connected to the rotational speed reduction mechanism, and a resistance is applied to the reciprocating movement of the piston when the control system has a failure.

Preferably, the piston is connected to the rotor which is closest to the throttle valve.

In a preferred embodiment, the throttle valve is rotated in the closing direction by the urging force of the urging mechanism and then held in a predetermined opening position when the control system has a failure.

In a preferred embodiment, the electronic throttle valve has a second urging mechanism for urging the throttle valve in the closing or opening direction.

Preferably, the urging mechanism is constituted of a mechanism having a spring.

Preferably, the rotors are reduction gears.

A two-wheeled motor vehicle according to the present invention is characterized by being provided with the above electronic throttle valve control system.

Effects of the Invention

According to the electronic throttle valve control system of the present invention, the urging mechanism for urging the throttle valve in the closing direction and the attenuation mechanism for attenuating the speed at which the throttle valve is rotated in the closing direction by the urging force of the urging mechanism are connected to the rotational speed reduction mechanism for reducing the rotation of the electric motor to control the rotation of the throttle valve. Thus, no additional housing space is required, and rapid rotation of the throttle valve can be prevented when the control system has a failure.

To control the opening and closing of the throttle valve with an electric motor, a rotational speed reduction mechanism for reducing the rotation of the electric motor is required. Since the urging mechanism for urging the throttle valve in the closing direction and the attenuation mechanism for attenuating the speed at which the throttle valve is rotated in the closing direction by the urging force of the urging mechanism are connected to the rotational speed reduction mechanism, no additional housing space has to be provided, and rapid rotation of the throttle valve can be prevented when the control system has a failure. Also, since the effects of the urging mechanism and the attenuation mechanism are exhibited in synchronization with the operation of the rotational speed reduction mechanism, rapid rotation of the throttle valve can be reliably prevented.

Since the electric motor connected to the rotational speed reduction mechanism is shifted to a regenerative mode and serves as the attenuating mechanism when the control system has a failure, there is no need to provide a special mechanism as the attenuating mechanism and an additional housing space for it.

In addition, a resistance is applied to the reciprocating movement of the piston connected to the rotational speed reduction mechanism so that the piston can serve as the attenuating mechanism when the control system has a failure, it is possible to produce the effect of the attenuating mechanism reliably. In the case where the rotational speed reduction mechanism is constituted of a plurality of rotors (such as reduction gears), when the piston is connected to the rotor which is closest to the throttle valve, the distance, through which the piston reciprocates according to the rotation of the rotor, is smallest and the attenuation mechanism can be compact.

BRIEF DESCRIPTION OF DRAWINGS

FIG. 3 is a view illustrating a configuration of a control circuit for an electric motor of the present invention, in which FIG. 3(a) shows the control circuit at the time when the electric motor is rotating in the forward direction, FIG. 3(b) shows the control circuit at the time when the electric motor is rotating in the reverse direction, and FIG. 3(c) shows the control circuit at the time when the electronic motor is in a regenerative mode.

DESCRIPTION OF REFERENCE NUMERALS

Figure 1:
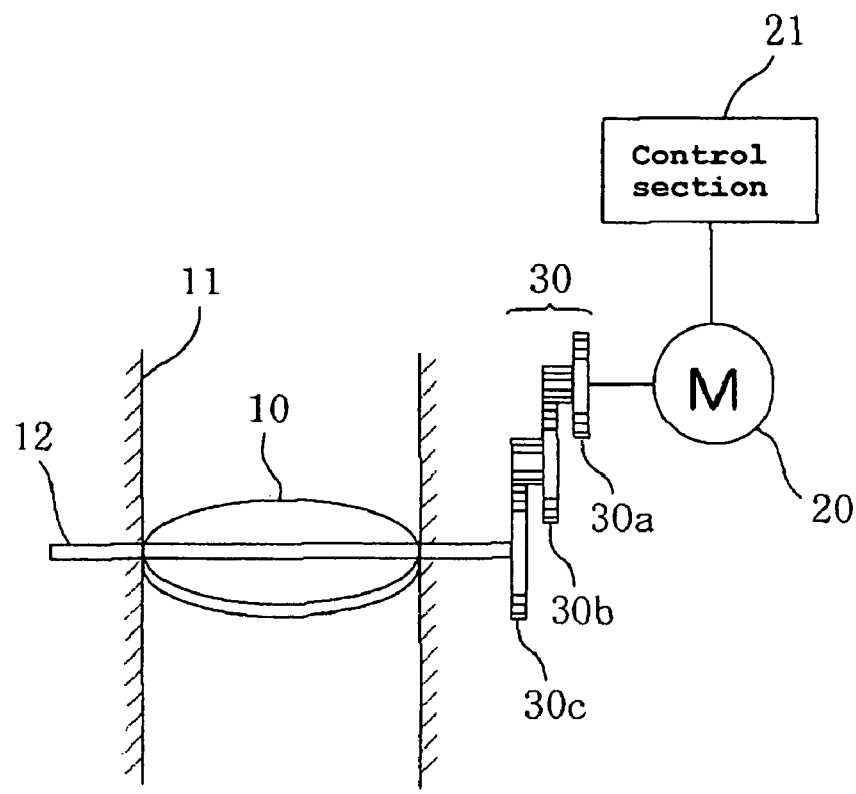
FIG. 1 is a view illustrating a configuration of an electronic throttle valve control system according to the present invention.

10: throttle valve
11, 41: throttle body
42: throttle valve
12, 42a: valve shaft
20, 43a: electric motor
21: control section
30: rotational speed reduction mechanism
30a, 30b, 30c: rotor (reduction gear)
31: urging mechanism (spring)
33, 73: piston
34, 72: cylinder
35, 74: air discharge port
36, 76: opening
37, 75: electromagnetic valve
38: attenuation mechanism
40: throttle mechanism
43: electric driving mechanism
43b: driving gear
43c: intermediate large gear
43e: valve shaft driving gear
43d: intermediate small gear
43f: case
44: throttle valve opening sensor
45: free arm
46: link plate
47: intermediate pulley
48: throttle cable 49: throttle trip
50: throttle grip opening sensor
51: fuel injection valve
52: fuel supply pipe
60: throttle operation mechanism
70: air damper
71: rod
100: control unit
103: vehicle speed sensor
107: engine unit
201, 202: input circuit
206: driving circuit
208: output monitoring circuit
214: motor power interrupt circuit
300: relay circuit

BEST MODE FOR CARRYING OUT THE INVENTION

An electronic throttle valve system is advantageous in reducing emission and fuel consumption but has to be equipped with a function which is activated when the electronic throttle valve control system has a failure. However, when a function used for a four-wheeled motor vehicle is applied to a two-wheeled motor vehicle, the rider of the two-wheeled motor vehicle feels a sudden change in the motion of the vehicle, which the driver of the four-wheeled motor vehicle does not feel, since a two-wheeled motor vehicle is lighter than a four-wheeled motor vehicle.

Such a sudden change in the motion of the vehicle is caused by rapid rotation of the throttle valve. To prevent rapid rotation of the throttle valve, cushioning means as disclosed in Patent Document 2 should be installed to the valve shaft of the throttle valve. It is, however, difficult to provide a space to install such cushioning means to the valve shaft of the throttle valve in a two-wheeled motor vehicle.

The present inventors considered that the restriction of the housing space raises an obstacle in applying an electronic throttle valve system to a two-wheeled motor vehicle. As a result of studies about how to provide cushioning means to an electronic throttle valve control system without increasing a housing space, the present invention has been accomplished.

Description will be hereinafter made of the electronic throttle valve control system of the present invention with reference to FIG. 1 to FIG. 3. The present invention is not limited to the following embodiments.

FIG. 1 is a view schematically illustrating the basic configuration of an embodiment of the electronic throttle valve control system. A throttle valve 10 for controlling the amount of intake air to an internal combustion engine (not shown) is disposed in a throttle body 11 and has a valve shaft 12 connected to an electric motor 20 for driving the throttle valve 10 via a rotational speed reduction mechanism 30. The rotational speed reduction mechanism 30 reduces the rotation of the electric motor 20 to control the rotation of the throttle valve 10.

In the example shown in FIG. 1, the rotational speed reduction mechanism 30 is constituted of a three rotors 30a, 30b and 30c with different reduction ratios. A control section 21 controls the forward and reverse rotation of the electric motor 20, whereby the throttle valve 10 is opened and closed. The rotors 30a, 30b and 30c can be reduction gears or links.

Figure 2:
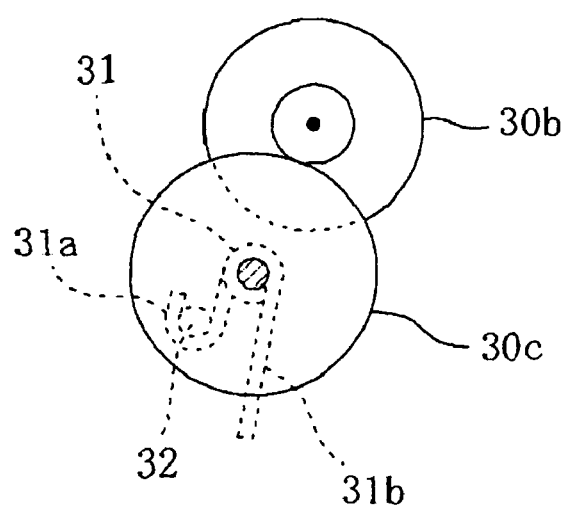
FIG. 2 is a side view illustrating the configuration of a rotational speed reduction mechanism equipped with an urging mechanism of the present invention.

FIG. 2 is a side view of some of the rotors (30b and 30c), viewed along the valve shaft 12 of the throttle valve 10. An urging mechanism (such as a spring) 31 is wound around the rotating shaft of the rotor 30c. One end 31a of the urging mechanism 31 is engaged on a pin 32 provided on the rotor 30c, and the other end 31b is supported on the outside of an external member such as the throttle body 11 (not shown). The urging mechanism 31 urges the valve shaft 12 (not shown) in the closing direction via the rotor 30c.

Since the urging mechanism 31 constituted as described above can be incorporated in the rotational speed reduction mechanism for transmitting the rotation of the electric motor 20 to the valve shaft of the throttle valve, there is no need for an additional housing space to install the urging mechanism 31. Also, a return spring of the rotational speed reduction mechanism for preventing backlash may be used as the urging mechanism 31.

When the rotational speed reduction mechanism 30 is constituted of a plurality of rotors, it is only necessary that the urging mechanism 31 is attached to at least one of the rotors. In the case of a multi-cylinder internal combustion engine in which each cylinder has a throttle valve 10, when the rotational speed reduction mechanism is located between two of the throttle valves, the throttle mechanism can be compact as a whole.

The control section 21 shifts the electric motor 20 to a regenerative mode when the control system has a failure to control the speed at which the throttle valve 10 is rotated in the closing direction by the urging force of the urging mechanism 31. That is, the electric motor in a regenerative mode serves as cushioning means for preventing rapid rotation of the throttle valve.

FIG. 3(a) to FIG. 3(c) are views illustrating a control circuit in the control section 21 for shifting the electric motor 20 to a regenerative mode when the control system has a failure. The control circuit is constituted of an H-bridge circuit having four transistors FET1 to FET4.

FIG. 3(a) illustrates the control circuit at the time when the electric motor 20 is rotating in the forward direction.

When the transistors FET1 and FET4 are turned on and the transistors FET2 and FET3 are turned off, a current flows as indicated by the arrow. FIG. 3(b) illustrates the control circuit at the time when the electric motor 20 is rotating in the reverse direction.

When the transistors FET2 and FET3 are turned on and the transistors FET1 and FET4 are turned off, a current flows as indicated by the arrow. By changing the direction in which the current flows through the electric motor 20, the rotating direction of the electric motor 20 is changed and the throttle valve 10 is controlled to be opened or closed.

FIG. 3(c) illustrates the control circuit at the time when the electric motor 20 is in a regenerative mode. When the transistors FET1 and FET2 are turned on and the transistors FET3 and FET4 are turned off, a current flows as indicated by the arrow. At this time, the electric motor 20 serves as an electric generator. Then, a counter-electromotive force is generated and a current in the opposite direction is produced. By the current, a torque in a direction opposite to the rotating direction of the electric motor 20 is generated and serves as a brake for reducing the rotation of the electric motor 20. The electric motor 20 can be shifted to the regenerative mode by turning off the transistors FET1 and FET2 are turning on the transistors FET3 and FET4. When the electric motor 20 is shifted to a regenerative mode, the power supply to the electric motor is preferably shut off.

The function in the present invention is activated by shifting the electric motor 20 to a regenerative mode, and the operation can be controlled using the control circuit for controlling the normal operation of the electric motor 20. That is, since the function in the present invention can be accomplished by using the electric motor 20 for driving the throttle valve 10 as a cushioning means for preventing rapid rotation of the throttle valve and the control circuit for controlling the forward and reverse rotation of the electric motor 20 as means for controlling the cushioning means, there is no need to provide any additional mechanism to a conventional electronic throttle valve control system.

Figure 3:
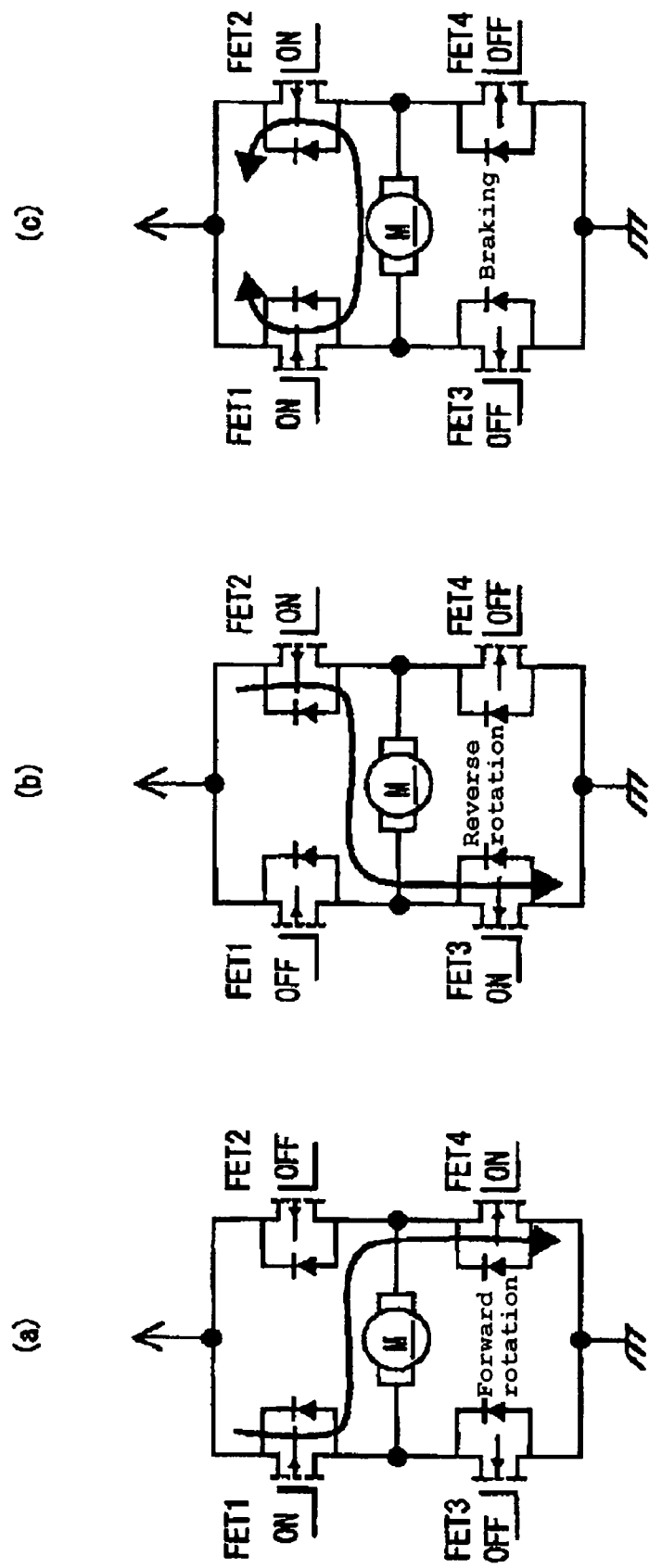
Figure 4:
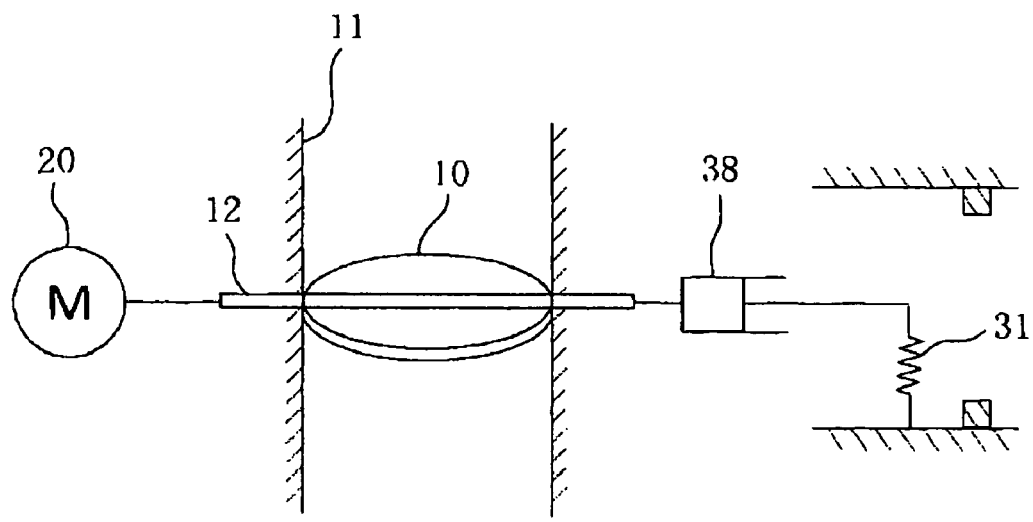
FIG. 4 is a view equivalently illustrating the configuration of the electronic throttle valve control system according to the present invention.

FIG. 4 is a view equivalently illustrating the configuration of an electronic throttle valve control system shown in FIG. 1 to FIG. 3.

The throttle valve 10 disposed in the throttle body 11 is driven to rotate by the electric motor 20 connected to the throttle valve 10 and, when the control system has a failure, the throttle valve 10 is rotated slowly in the closing direction by the urging mechanism 31 for urging the throttle valve in the closing direction and an attenuation mechanism 38 for attenuating the speed, at which the throttle valve 10 is rotated in the closing direction by the urging force of the urging mechanism, and held in a predetermined opening position.

A feature here is that at least one of the urging mechanism 31 and the attenuation mechanism 38 is connected to the rotational speed reduction mechanism 30. Since the urging mechanism 31 and/or the attenuation mechanism 38 is operated in synchronization with the operation of the rotational speed reduction mechanism 30, the effect of the urging mechanism and/or the attenuation mechanism is reliably exhibited.

In the example shown in FIG. 1 to FIG. 3, the electric motor 20 is shifted to a regenerative mode and serves as the attenuation mechanism 38 when the control system has a failure.

Figure 5:
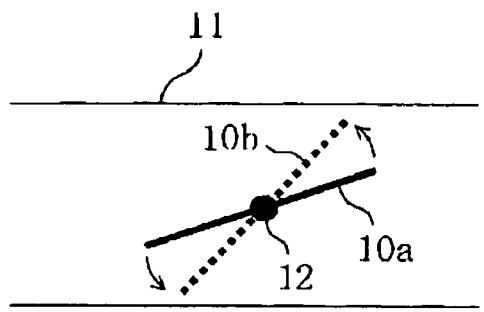
FIG. 5 is a cross-sectional view illustrating opening positions of the throttle valve in the present invention.

FIG. 5 is a cross-sectional view illustrating opening positions of the throttle valve 10 in the throttle body 11, viewed in a direction parallel to the valve shaft 12 of the throttle valve 10. In FIG. 5, the solid line represents an opening position 10a of the throttle valve 10 during normal operation. When the control system has a failure, the throttle valve 10 is rotated in the closing direction (the direction indicated by the arrows) by the urging force of the urging mechanism 31 and then held in a predetermined opening position 10b represented by the dotted line.

The urging force of the urging mechanism 31 is adjusted so that the opening of the throttle valve 10 is enough for the internal combustion engine to be maintained in such a state that a failure operation can be conducted at the predetermined opening position 10b shown in FIG. 5. In this state, the vehicle can be at least driven to a place such as a roadside even when the electric control of the electronic throttle valve system is lost. It includes the idle operation state.

Figure 6:
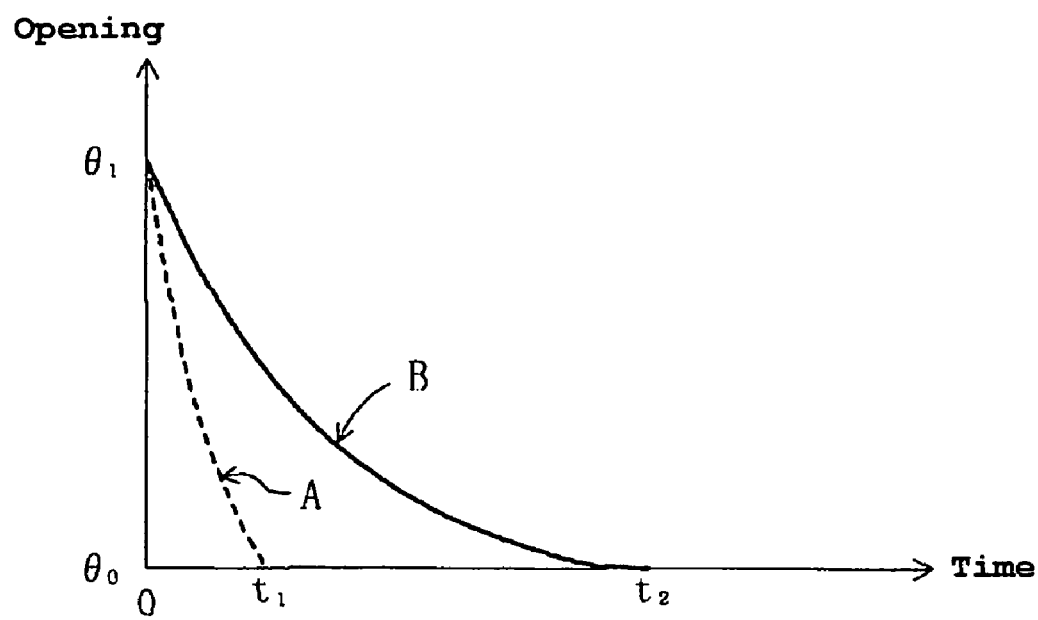
FIG. 6 is a graph showing the change in the opening of the throttle valve with respect to time in the present invention.

FIG. 6 is a graph showing the change in the opening of the throttle valve 10 with respect to time during the period when the throttle valve 10 is rotated from a position with an opening $\theta_1$ at the time when the control system has a failure to a position with a predetermined opening $\theta_0$.

Although the throttle valve is rotated in the closing direction and held in a predetermined opening position when the control system has a failure in this embodiment, the throttle valve may be rotated to the full closed position when the internal combustion engine can be maintained by other means in such a state that a failure operation can be conducted. For example, when a bypass line is provided in the throttle body so that a certain amount of air can be introduced into the internal combustion engine through the bypass line when the control system has a failure, the internal combustion engine can be maintained in such a state that a failure operation can be conducted. In the case of a two-wheeled motor vehicle, there is no need to provide such a bypass line when it is so light that the rider can walk it even when the throttle valve is fully closed.

The dotted curve A represents the case where the throttle valve 10 is rotated in the closing direction only by the urging force of the urging mechanism 31. The opening of the throttle valve 10 reaches the predetermined opening $\theta_0$ within a very short period of time ($t_1$). The solid curve B represents the case where the electric motor 20 is shifted to a regenerative mode to rotate the throttle valve 10 in the closing direction at a reduced speed. The opening of the throttle valve 10 takes a long time ($t_2$) to reach the predetermined opening $\theta_0$.

According to the electronic throttle valve control system of the present invention, the throttle valve is not rotated rapidly even when the control system has a failure and a function is activated. As a result, the rider of the two-wheeled motor vehicle does not feel a sudden change in the motion of the vehicle.

Figure 7:
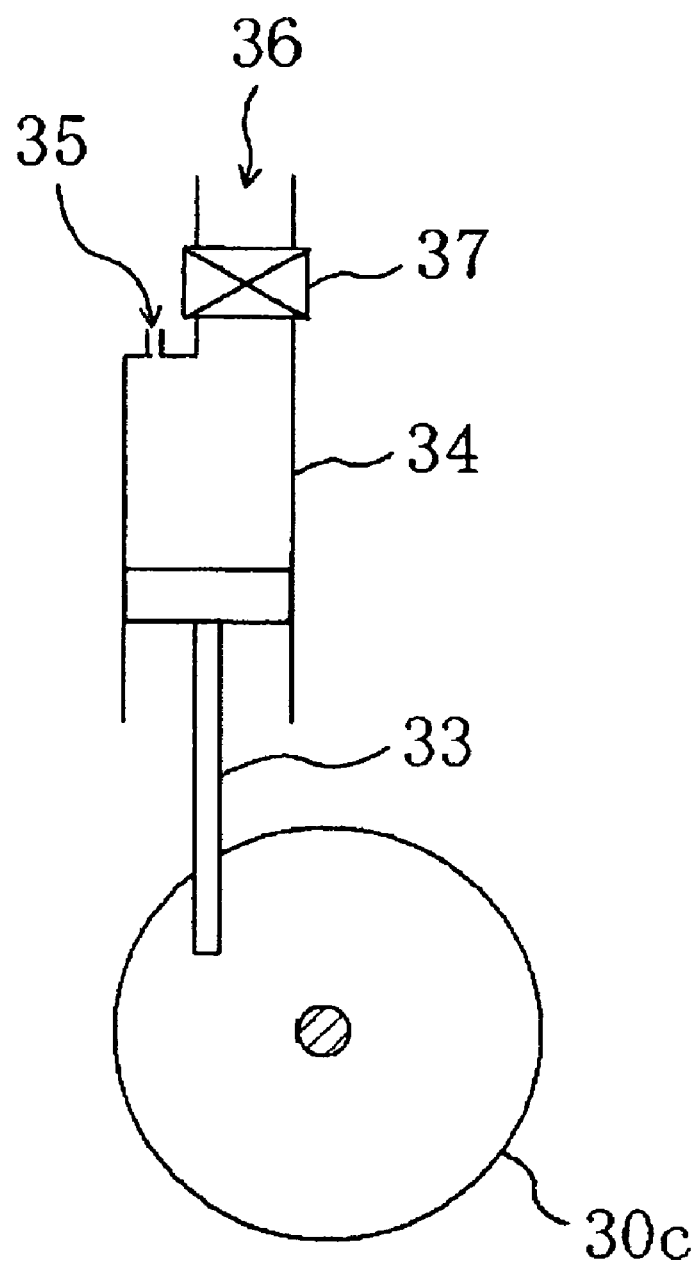
FIG. 7 is a view illustrating another configuration of the electronic throttle valve control system according to the present invention.

FIG. 7 is a view illustrating an example in which an air damper is used as the attenuation mechanism 38. An end of a piston 33 reciprocable in a cylinder 34 is connected to the rotor 30c. The cylinder 34 has an air discharge port 35 and an opening 36 at its end, and an electromagnetic valve 37 is attached in the opening 36. The magnitude of resistance applied to the reciprocating movement of the piston 33 in the cylinder 34 is controlled by opening and closing the electromagnetic valve 37.

When the electronic throttle valve system is operating normally, the electromagnetic valve 37 is opened and no resistance is applied to the reciprocating movement of the piston 33 in synchronization with the rotor 30c. When the control system has a failure, the electromagnetic valve 37 is closed and a resistance is applied to the reciprocating movement of the piston 33.

That is, when the electronic throttle valve system is operating normally, no influence is given to the opening and closing operation of the throttle valve 10 caused by rotation of the rotational speed reduction mechanism 30. When the control system has a failure, a resistance is applied to the rotation of the rotational speed reduction mechanism 30 and the speed, at which the throttle valve 10 is rotated in the closing direction by the urging force of the urging mechanism 31, can be attenuated.

The piston 33 is preferably connected to the rotor 30c, which is closest to the throttle valve 10. The rotational speed reduction mechanism 30 for reducing the rotation of the electric motor 20 is usually constituted of a number of parts complexly assembled, and the rotor 30c, which is closest to the throttle valve 10, has the smallest turn range. Thus, when the piston 33 is connected to the rotor 30c, the distance through which the piston 33 reciprocates is smallest, and the air damper as an attenuation mechanism can be compact.

Since the force necessary to attenuate the speed, at which the throttle valve is rotated in the closing direction (attenuating force), is determined by the relation with the force of the urging mechanism by which the throttle valve is urged in the closing direction, when the urging force is small, the attenuating force can be small. Thus, the normal operation of the electronic throttle valve system is not affected even if the attenuation mechanism is constantly connected to the rotational speed reduction mechanism as long as the attenuating force is smaller than the torque of the electric motor. In this case, when the air discharge port 35 has a suitable size when an air damper is used as the attenuation mechanism, there is no need to open and close the opening 36 with the electromagnetic valve 37 and the structure of the attenuation mechanism can be simple.

The electronic throttle valve control system according to the present invention has been described. The configuration of the electronic throttle valve control system will be hereinafter specifically described with reference to FIG. 8 to FIG. 12.

Figure 8:
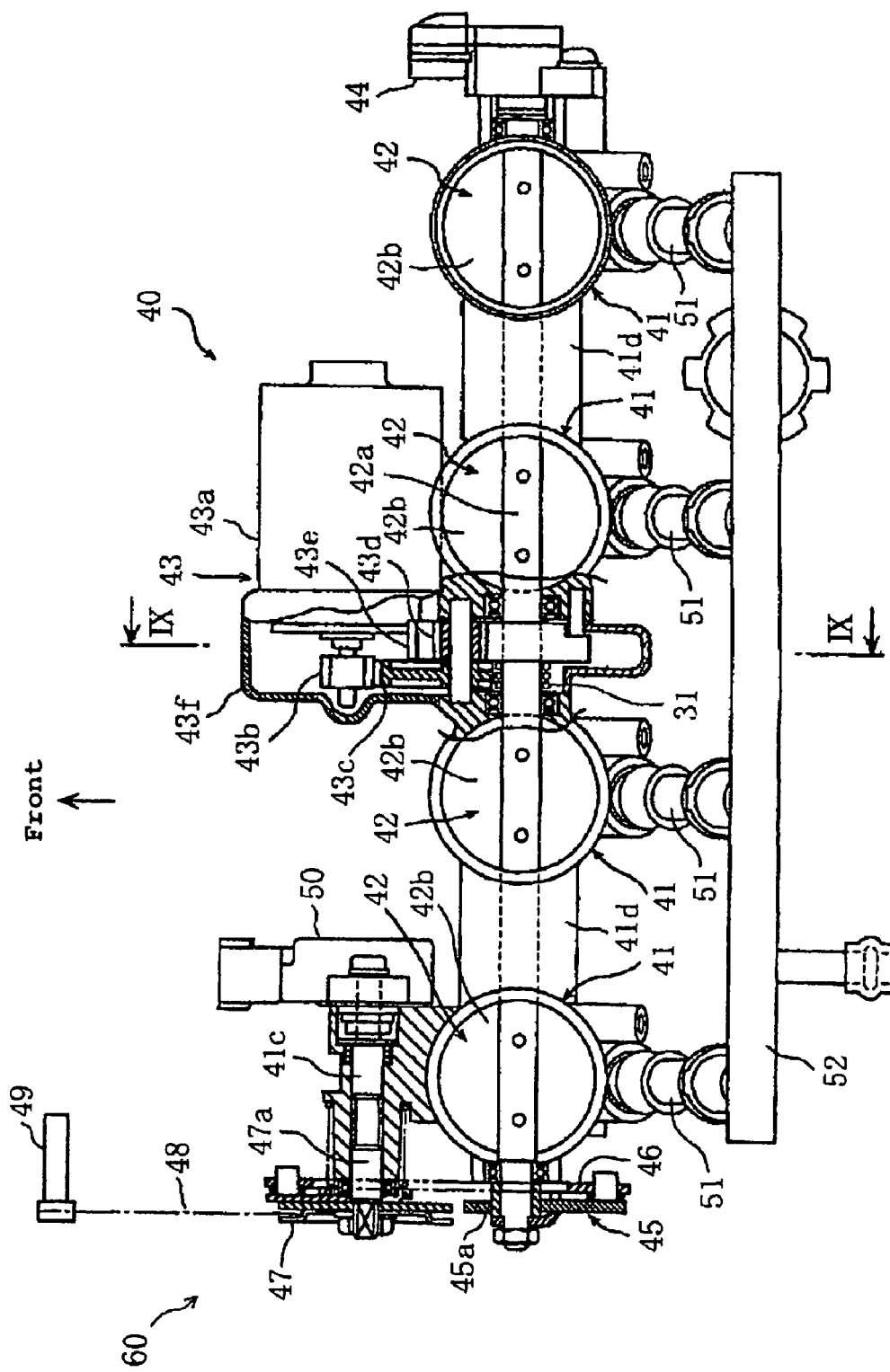
FIG. 8 is a view illustrating the configuration of the throttle mechanism in the present invention.

FIG. 8 is a view illustrating the configuration of a throttle mechanism 40 connected to intake ports of cylinders of an engine unit (not shown).

Each throttle body 41 has a cylindrical shape, and each throttle valve 42 comprises a disk-like valve plate 42b disposed in the corresponding throttle body 41 and fixed to a common valve shaft 42a extending through all the throttle bodies 41. The right two throttle bodies 41 and the left two throttle bodies 41 in FIG. 8 are connected to each other by a connecting boss 41d, and an electric driving mechanism 43 is disposed between the center two throttle bodies 41.

The electric driving mechanism 43 has an electric motor 43a positioned with its rotating shaft parallel to the valve shaft 42a. The rotation of a driving gear 43b attached to the rotating shaft of the electric motor 43a is transmitted to a sector-shaped valve shaft driving gear 43e fixed to the valve shaft 42a via an intermediate large gear 43c and an intermediate small gear 43d. The valve shaft 42a is driven to rotate by the valve shaft driving gear 43e. The electric driving mechanism 43 is housed in a case 43f formed separately from the throttle bodies 41.

A throttle valve opening sensor 44 for detecting the opening of the throttle valves 42 is attached to the right end of the valve shaft 42a extending outward. A disk-shaped boss 45a of a free arm 45 is attached to the left end of the valve shaft 42a for relative rotation. The free arm 45 has an arm portion 45b (not shown) connected to an intermediate pulley 47 via a link plate 46. The intermediate pulley 47 is connected to a throttle grip 49 on a steering handle bar via a throttle cable 48.

The link plate 46, the intermediate pulley 47, the throttle cable 48 and the throttle grip 49 constitute a throttle operation mechanism 60 which opens and closes the throttle valves 42 manually in accordance with the degree to which the throttle grip 49 is operated by the rider. The electric driving mechanism 43 and the throttle operation mechanism 60 function as driving sources.

The intermediate pulley 47 is fixedly supported by the left end of an intermediate shaft 47a for rotation together therewith, and the intermediate shaft 47a is rotatably supported by a boss 41c formed on the leftmost throttle body 41. A throttle grip opening sensor 50 for detecting the angle through which the throttle grip 49 is operated is attached to the right end of the intermediate shaft 47a.

Fuel injection valves 51 for each cylinder are disposed under the throttle bodies 41, and a common fuel supply pipe 52 is connected to fuel introduction sections of the fuel injection valves 51.

Figure 9:
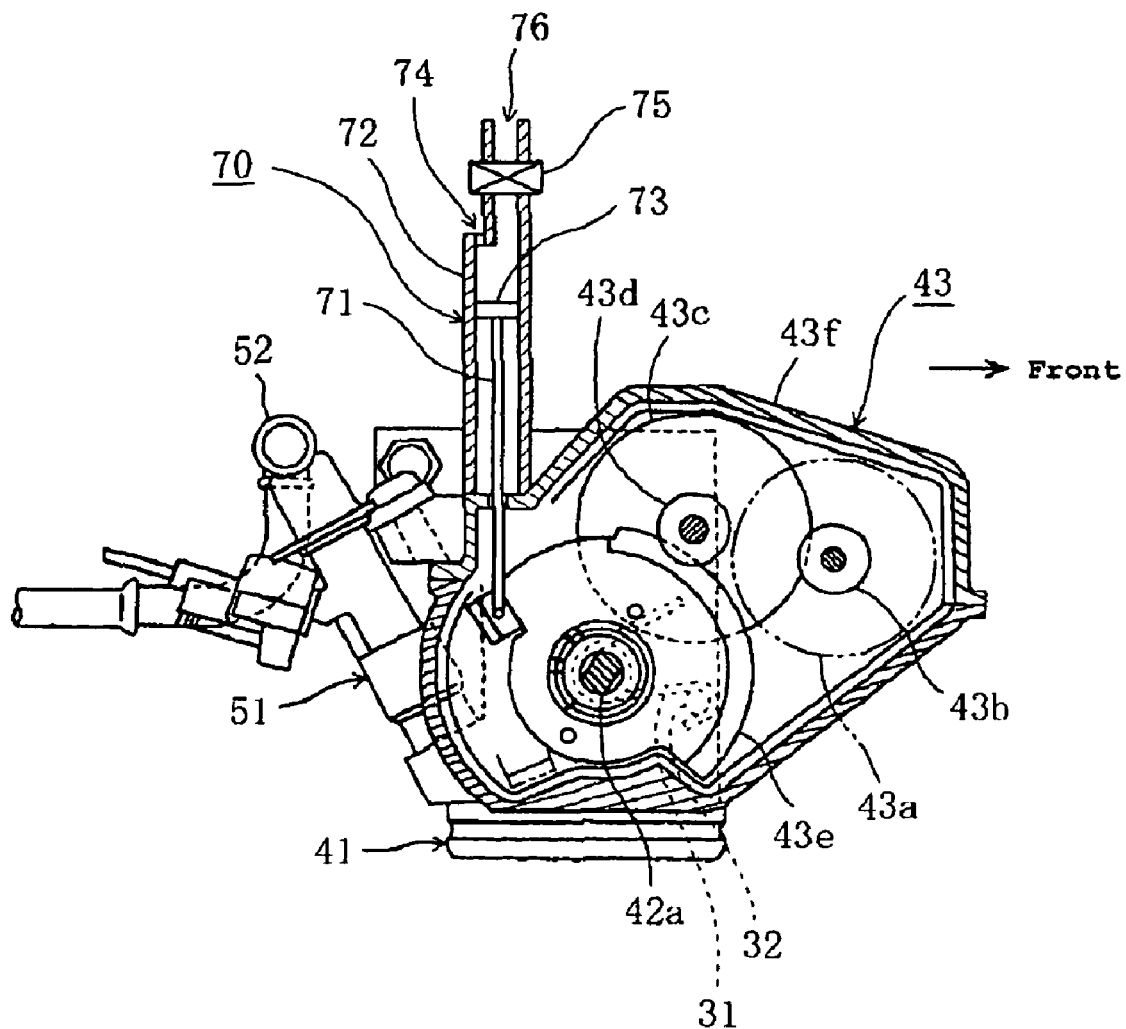
FIG. 9 is a cross-sectional view of an electric driving mechanism equipped with an urging mechanism and an attenuation mechanism in the present invention.

FIG. 9 is a view illustrating the electric driving mechanism 43 provided with a spring 31 as an urging mechanism and an air damper 70 as an attenuation mechanism.

The spring 31 is wound around the rotating shaft of the valve shaft driving gear 43e. One end of the spring 31 is engaged on a pin 32 provided on the valve shaft driving gear 43e, and the other end is supported by the case 43f or a throttle body (not shown). The spring 31 urges the valve shaft 42a in the closing direction via the valve shaft driving gear 43e.

A piston 73 of the air damper 70 has a rod 71 supported by the valve shaft driving gear 43e. An end of a cylinder 72 of the air damper 70 is connected to a case 43f, and the air damper 70 is therefore integrated with the electric driving mechanism 43.

The cylinder 72 has an air discharge port 74 and an opening 76 at its end, and an electromagnetic valve 75 is attached in the opening 76. The magnitude of resistance applied to the reciprocating movement of the piston 73 in the cylinder 72 is controlled by opening and closing the electromagnetic valve 75.

When the electronic throttle valve system is operating normally, the electromagnetic valve 75 is opened and no resistance is applied to the reciprocating movement of the piston 73 in synchronization with the valve shaft driving gear 43e. When the control system has a failure, the electromagnetic valve 75 is closed and a resistance is applied to the reciprocating movement of the piston 73.

The air discharge port 74 is small enough that a resistance is applied to the reciprocating movement of the piston 73, and the opening 76 is large enough that no resistance is applied to the reciprocating movement of the piston 73 when opened.

The rod 71 of the piston 73 is connected to the valve shaft driving gear 43e, which is closest to the throttle valve 10 among the parts of the rotational speed reduction mechanism. Since the valve shaft driving gear 43e, which is closest to the throttle valve 10, has the smallest turn range, when the piston 73 is connected to the valve shaft driving gear 43e, the distance through which the piston 73 reciprocates is smallest and the air damper 70 can be compact.

Figure 10:
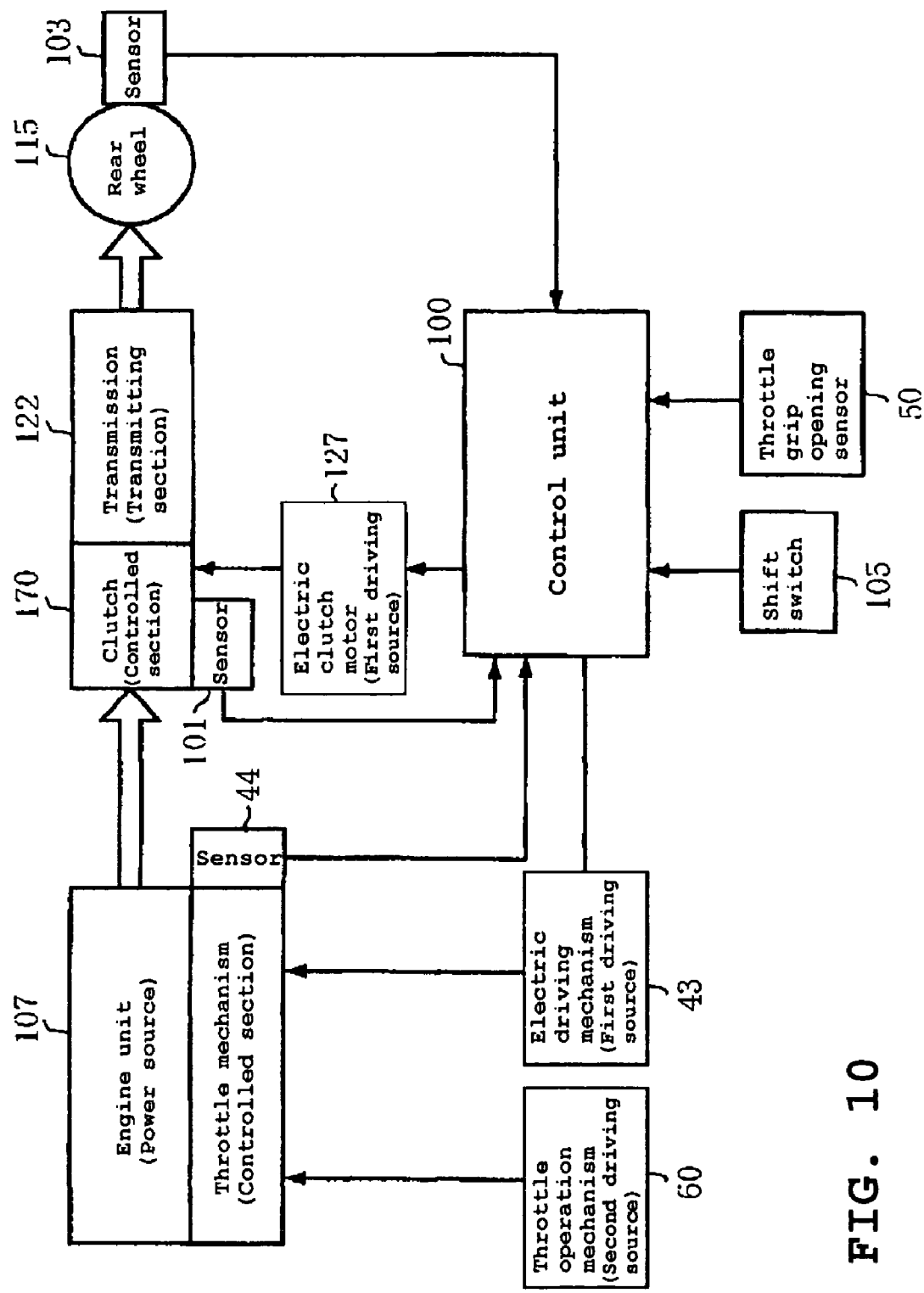
FIG. 10 is a block diagram illustrating the control system of the throttle mechanism in the present invention.

FIG. 10 is a block diagram illustrating the configuration of the control system of the throttle mechanism.

In an engine unit 107, the throttle mechanism 40 controls the amount of intake air to the cylinders and the fuel injection valves 51 adjust the amount of fuel to be injected into the cylinders to control the output power. In the throttle mechanism 40, the valve shaft 42a is rotated by the driving force of the electric motor 43a in the electric driving mechanism 43 and the throttle valves 42 are opened and closed. The throttle valve opening sensor 44 detects the opening of the throttle valves 42 and outputs a throttle opening detection signal to a control unit 100.

The electric motor 43a in the electric driving mechanism 43 generates a driving force for rotating the valve shaft 42a in the throttle mechanism 40 via the driving gear 43b, the intermediate large gear 43c and the intermediate small gear 43d according to a throttle driving signal inputted from the control unit 100. The throttle operation mechanism 60 manually opens or closes the throttle valves 42 in accordance with the degree to which the throttle grip 49 is operated by the rider when the driving force from the electric driving mechanism 43 is cut off.

A vehicle speed sensor 103 detects the rotational speed of a rear wheel 115 and outputs a vehicle speed signal corresponding to the rotational speed to the control unit 100. The throttle grip opening sensor 50 detects the angle through which the throttle grip 49 is operated and outputs a throttle operation angle detection signal to the control unit 100. A shift switch 105 outputs a shift position signal to the control unit 100 in response to the manual operation of the rider.

Figure 11:
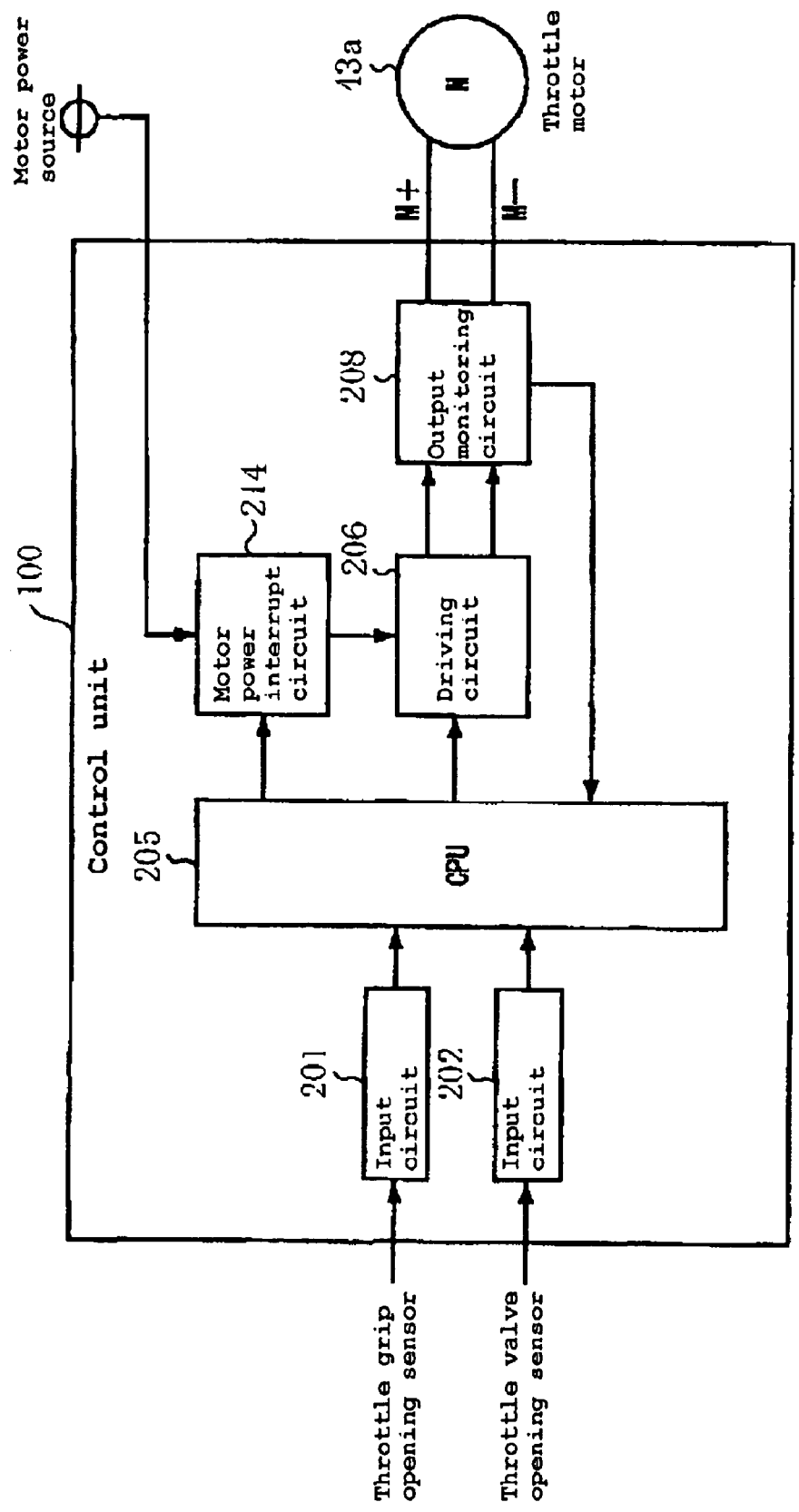
FIG. 11 is a view illustrating the configuration of a control unit in the present invention.

FIG. 11 is a block diagram of the control unit 100. The control unit 100 is constituted of a plurality of input circuits 201 and 202, a CPU 205, a driving circuit 206, an output monitoring circuit 208 and a motor power interrupt circuit 214.

The input circuit 201 outputs a throttle opening detection signal inputted from the throttle valve opening sensor 44 to the CPU 205. The input circuit 202 outputs a throttle operation angle detection signal inputted from the throttle grip opening sensor 50 to the CPU 205. The CPU 205 outputs a control signal for controlling the operation of the electric motor 43a in the electric driving mechanism 43 to the driving circuit 206 based on the signals inputted from the input circuits 201 and 202.

The CPU 205 has a function of monitoring the operating condition of itself and detecting its abnormal operation. When detecting abnormal operation, the CPU 205 outputs an interrupt signal to the motor power interrupt circuit 214 and a mode switching signal for shifting the electric motor 43*a* to a brake mode to the driving circuit 206.

The CPU 205 also has a function of detecting an abnormality of the sensors 44 and 50 based on the signals inputted from the input circuits 201 and 202. When detecting an abnormality of the sensor 44 or 50, the CPU 205 outputs an abnormality signal to the motor power interrupt circuit 214 and a mode switching signal for shifting the electric motor 43*a* to a brake mode to the driving circuit 206.

The CPU 205 also has a function of detecting an abnormality of the driving circuit 206 and the electric motor 43*a* based on a signal inputted from the output monitoring circuit 208. When detecting an abnormality of the driving circuit 206 or the electric motor 43*a*, the CPU 205 outputs a mode switching signal to the driving circuit 206.

The driving circuit 206 is an H-bridge circuit having four transistors FET1 to FET4 (see FIG. 3). When the driving circuit 206 and the electric motor are in the forward rotation mode, the transistors FET1 and FET4 are turned on and the transistors FET2 and FET3 are turned off, and a current flows as shown in FIG. 3(*a*). When the driving circuit 206 and the electric motor are in the reverse rotation mode, the transistors FET2 and FET3 are turned on and the transistors FET1 and FET4 are turned off, and a current flows as shown in FIG. 3(*b*).

When the driving circuit 206 and the electric motor are in the brake mode, the transistors FET1 and FET2 are turned on and the transistors FET3 and FET4 are turned off, and a current flows as shown in FIG. 3(*c*). At this time, the electric motor 43*a* serves as an electric generator. Then, a counter-electromotive force is generated and a current in the opposite direction is produced. By the current, a torque in a direction opposite to the rotating direction of the electric motor 43*a* is generated and serves as a brake.

The driving circuit 206 controls the turn-on and turn-off of the transistors FET1 to FET4 based on a control signal inputted from the CPU 205 to control the forward and reverse rotation of the electric motor 43*a*. The driving circuit 206 controls the turn-on and turn-off of the transistors FET1 to FET4 based on a mode switching signal inputted from the CPU 205 to control the braking operation of the electric motor 43*a*.

The output monitoring circuit 208 detects the driving current flowing between the driving circuit 206 and the electric motor 43*a* and outputs a driving current signal to the CPU 205.

The motor power interrupt circuit 214 supplies power from a motor power source to the driving circuit 206. When receiving an abnormality signal from the CPU 205, the motor power interrupt circuit 214 cuts off the power supply from the motor power source to the driving circuit 206. The throttle valve opening sensor 44 and the vehicle speed sensor 103 serve as detecting sections for detecting the operating conditions of the vehicle.

The control operation of the electronic throttle valve system in normal times will be described.

In a two-wheeled motor vehicle, when the rider operates the throttle grip 49, the angle through which the throttle grip 49 is operated is detected by the throttle grip opening sensor 50 and a throttle operation angle detection signal is inputted into the CPU 205 in the control unit 100. The opening of the throttle valves 42 is detected by the throttle valve opening sensor 44, and a throttle opening detection signal is inputted into the CPU 205 in the control unit 100.

The CPU 205 outputs a control signal for controlling the operation of the electric motor 43*a* in the electric driving mechanism 43 to the driving circuit 206 based on the throttle operation angle detection signal inputted from the throttle grip opening sensor 50 and the throttle opening detection signal inputted from the throttle valve opening sensor 44.

The driving circuit 206 controls the turn-on and turn-off of the transistors FET1 to FET4 based on the control signal inputted from the CPU 205 to rotate the electric motor 43*a* in the forward or reverse direction so that the throttle valves 42 can be opened or closed to a desired opening position.

The control operation at the time when the electronic throttle valve control system has a failure will be described.

When detecting an abnormality in the operation, the CPU 205 outputs an interrupt signal to the motor power interrupt circuit 214 and a mode switching signal to the driving circuit 206. When receiving the interrupt signal from the CPU 205, the motor power interrupt circuit 214 cuts off the power supply from the motor power source to the driving circuit 206.

When the motor power interrupt circuit 214 cuts off the power supply from the motor power source and the driving circuit 206 receives the mode switching signal from the CPU 205, the transistors FET1 and FET2 are turned on and the transistors FET3 and FET4 are turned off as shown in FIG. 3(*c*) to shift the driving circuit 206 to the brake mode in order to prevent rapid rotation of the electric motor 43*a*.

Thus, when the CPU 205 detects an abnormality, the motor power interrupt circuit 214 cuts off the power supply from the motor power source and the driving circuit 206 is shifted to the brake mode. Then, the electric motor 43*a* in the electronic driving mechanism 43 serves as an electric generator, and a counter-electromotive force is generated and a current in the opposite direction is produced. By the current, a torque in a direction opposite to the rotating direction of the electric motor 43*a* is generated and serves as a brake. As a result, the electric motor 43*a* is shifted to the brake mode and an abrupt action of the throttle valve 42 is prevented. After that, the rider can open or close the throttle valve 42 manually by operating the throttle grip 49.

As described above, when the CPU 205 detects an abnormality, rapid rotation of the electric motor 43*a* can be prevented to prevent an abrupt action of the throttle valve 42. Thus, it is possible to prevent a sudden change in the motion of the two-wheeled motor vehicle and a change in the operability for the rider.

The control operation at the time when the sensor 44 or 50 has a failure will be described.

When detecting an abnormality in a throttle opening detection signal or throttle operation angle detection signal inputted from the input circuit 201 or 202, the CPU 205 determines that the throttle valve opening sensor 44 or the throttle grip opening sensor 50 has a failure and outputs an interrupt signal to the motor power interrupt circuit 214 and a mode switching signal to the driving circuit 206. When receiving the interrupt signal from the CPU 205, the motor power interrupt circuit 214 cuts off the power supply from the motor power source to the driving circuit 206.

When the motor power interrupt circuit 214 cuts off the power supply from the motor power source and the driving circuit 206 receives the mode switching signal from the CPU 205, the transistors FET1 and FET2 are turned on and the transistors FET3 and FET4 are turned off as shown in FIG. 3(*c*) to shift the driving circuit 206 to the brake mode in order to prevent rapid rotation of the electric motor 43*a*.

Thus, the throttle valve opening sensor 44 or the throttle grip opening sensor 50 has a failure, the motor power interrupt circuit 214 cuts off the power supply from the motor power source and the driving circuit 206 is shifted to the brake mode. Then, the electric motor 43*a* in the electronic driving mechanism 43 serves as an electric generator, and a counter-electromotive force is generated and a current in the opposite direction is produced. By the current, a torque in a direction opposite to the rotating direction of the electric motor 43*a* is generated and serves as a brake.

As a result, when the throttle valve opening sensor 44 or the throttle grip opening sensor 50 has a failure, rapid rotation of the electric motor 43*a* can be prevented to prevent an abrupt action of the throttle valve 42 and a sudden change in the motion of the two-wheeled motor vehicle. Thus, the rider does not feel discomfort and a change in the operability.

As described previously, in the electronic throttle valve control system, when the sensor 44 or 50 has a failure, the power supply from the motor power source to the driving circuit 206 for driving the electric motor 43*a* is cut off and then the electronic motor 43*a* is shifted to the brake mode by the driving circuit 206.

Thus, when the control system has a failure, an abrupt action of the throttle valve caused by rapid rotation of the electric motor can be prevented and a sudden change in the motion of the two-wheeled vehicle can be prevented. As a result, the rider does not feel discomfort and a change in the operability. Also, there is no need to provide an additional mechanism in the driving system or an additional circuit in the control system, the above function can be achieved at a low cost.

Figure 12:
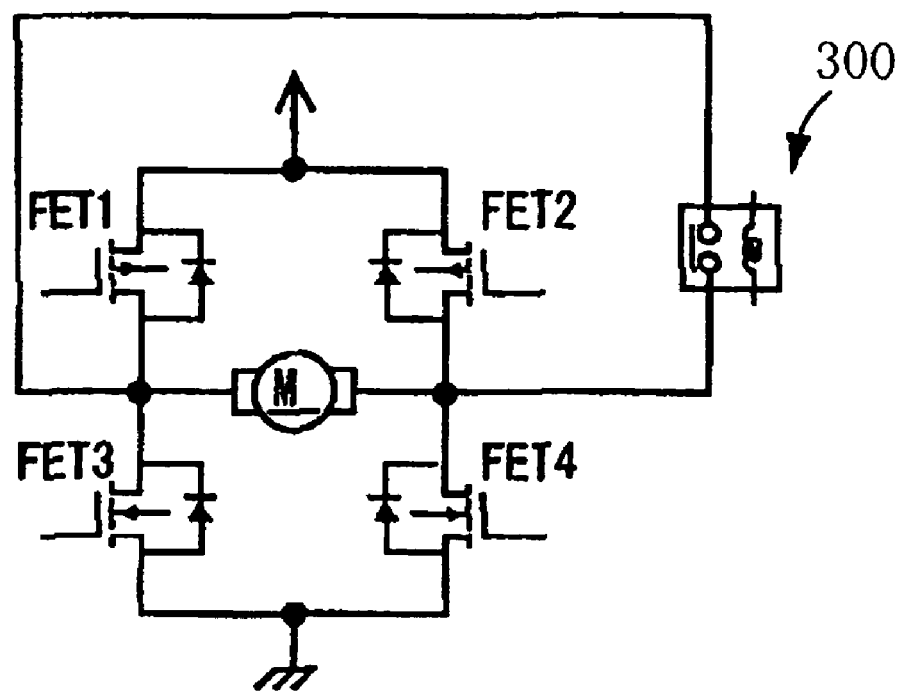
FIG. 12 is a view illustrating a configuration of a control circuit for an electric motor in the present invention.

In the above example, since the driving circuit is constituted of an H-bridge circuit having transistors FET1 to FET4, a failure of any of the transistors FET1 to FET4 may make the shift to the brake mode difficult. Thus, a relay circuit 300 for braking operation may be connected to the H-bridge circuit as shown in FIG. 12.

In this case, in the event of a failure, the electric motor can be reliably shifted to the brake mode by cutting off the power supply from the motor power source to the driving circuit and activating the relay circuit 300. As a result, the reliability of the braking operation can be enhanced. As an element for use in the relay circuit 300 is not limited to a relay switch. A semiconductor element capable of switching operation may be used.

Although the present invention is applied to a vehicle having an engine unit as a power source in the above example, this invention is not limited thereto. The present invention is applicable to a vehicle having an electric motor, for example, as a power source. Also, although the throttle mechanism has the electric driving mechanism 43 and the throttle operation mechanism 60 as driving sources, the spring for urging the throttle valves may be used as a driving source.

Although the case, in which the sensor 44 or 50 of the electronic throttle valve control system has a failure, is described in the above example, the present invention is not limited thereto. The control system of the present invention can react to any failure in the electronic throttle valve control system.

Although the present invention has been described in its preferred embodiments, the description is not for the purpose of limitation, and it is to be understood that various modifications can be made. The two-wheeled motor vehicle in the embodiments means a motorcycle, including motor bike and motor scooter, and, more particularly, is a vehicle which can be turned by tilting the vehicle body. Thus, a vehicle, equipped with two or more front wheels and/or two or more rear wheels, that is, having three or four (or more) wheels in total, is also included in the "two-wheeled motor vehicle."

INDUSTRIAL APPLICABILITY

According to the present invention, there can be provided an electronic throttle valve control system which needs no additional housing space and can prevent rapid rotation of a throttle valve when the control system has a failure.

The invention claimed is:

1. An electronic throttle valve control system having:
   a throttle valve for controlling the amount of intake air to an internal combustion engine;
   an electric motor for driving the throttle valve; and
   a rotational speed reduction mechanism for reducing the rotation of the electric motor to control the rotation of the throttle valve; further comprising:
   an urging mechanism for urging the throttle valve in the closing direction; and
   an attenuation mechanism for attenuating the speed at which the throttle valve is rotated in the closing direction by the urging force of the urging mechanism when the control system has a failure,
   wherein at least one of the urging mechanism and the attenuation mechanism is connected to the rotational speed reduction mechanism.

2. The electronic throttle valve control system of claim 1, wherein the urging mechanism is incorporated in the rotational speed reduction mechanism and the attenuation mechanism is connected to the rotational speed reduction mechanism.

3. The electronic throttle valve control system of claim 1, wherein the rotational speed reduction mechanism is connected to the electric motor, and the electric motor is shifted to a regenerative mode and serves as the attenuation mechanism when the control system has a failure.

4. The electronic throttle valve control system of claim 1, wherein the internal combustion engine is a multi-cylinder internal combustion engine having a plurality of cylinders, each provided with a throttle valve, and the rotational speed reduction mechanism is located between two of the throttle valves.

5. The electronic throttle valve control system of claim 1, wherein the rotational speed reduction mechanism comprises a plurality of rotors provided between the electric motor and the throttle valve, and the urging mechanism is attached to at least one of the plurality of rotors.

6. The electronic throttle valve control system of claim 1, wherein the attenuation mechanism comprises a piston reciprocable in a cylinder and connected to the rotational speed reduction mechanism, and a resistance is applied to the reciprocating movement of the piston when the control system has a failure.

7. The electronic throttle valve control system of claim 6, wherein the piston is connected to the rotor which is closest to the throttle valve.

8. The electronic throttle valve control system of claim 1, wherein the throttle valve is rotated in the closing direction by the urging force of the urging mechanism and then held in a predetermined opening position when the control system has a failure.

9. The electronic throttle valve control system of claim 1, wherein the electronic throttle valve has a second urging mechanism for urging the throttle valve in the closing or opening direction.

10. The electronic throttle valve control system of claim 1, wherein the urging mechanism comprises a mechanism having a spring.

11. The electronic throttle valve control system of claim 5, wherein the rotors are reduction gears.

12. A two-wheeled motor vehicle provided with the electronic throttle valve control system according to claim 1.

* * * * *